United States Patent [19]

Wanner et al.

[11] 4,113,037
[45] Sep. 12, 1978

[54] ROCK DRILL

[75] Inventors: Karl Wanner, Echterdingen; Wilbert Reibetanz, Leinfelden, both of Fed. Rep. of Germany

[73] Assignee: Robert Bosch GmbH, Stuttgart, Fed. Rep. of Germany

[21] Appl. No.: 749,034

[22] Filed: Dec. 9, 1976

[30] Foreign Application Priority Data

Feb. 10, 1976 [DE] Fed. Rep. of Germany ....... 2605097
Aug. 11, 1976 [DE] Fed. Rep. of Germany ....... 2636083
Oct. 9, 1976 [DE] Fed. Rep. of Germany ....... 2645693

[51] Int. Cl.² .......................................... E21B 21/00
[52] U.S. Cl. .................................. 175/207; 175/211; 175/320
[58] Field of Search .............. 175/320, 211, 207, 209, 175/210, 212, 213

[56] References Cited

U.S. PATENT DOCUMENTS

| 1,109,782 | 9/1914 | Purcell | 175/213 X |
| 2,879,035 | 3/1959 | Tilden | 175/213 X |
| 3,162,255 | 12/1964 | McCarty | 175/213 |
| 3,422,913 | 1/1969 | Young | 175/213 |
| 3,655,001 | 4/1972 | Hoffman | 175/213 |
| 3,735,824 | 5/1973 | Aström | 175/213 |

FOREIGN PATENT DOCUMENTS 236,319 10/1964 Austria ...................................... 175/207

Primary Examiner—Ernest R. Purser
Assistant Examiner—William F. Pate, III

[57] ABSTRACT

A rock drill comprises a shaft having a leading and a trailing end, a shank connected to the trailing end, and a drill head connected to the leading end of the shaft. Means for transporting drilling from the leading end toward the trailing end of the shaft are provided which include at least one channel extending parallel to the shaft from the drill head toward the shank. A shell coaxially surrounds the shaft and bounds the channel, which shell has an open front end adjacent the drill head, a closed rear end facing the shank and at least one transverse bore adjacent the rear end of the shaft and open at the outer surface of the shell.

31 Claims, 8 Drawing Figures

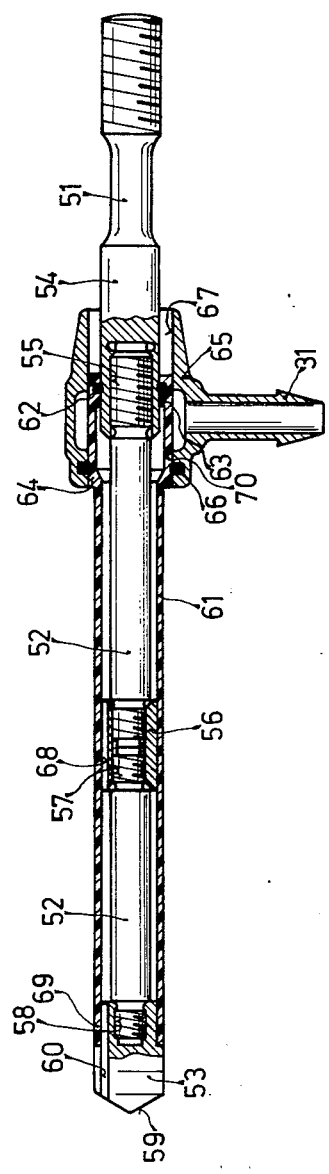
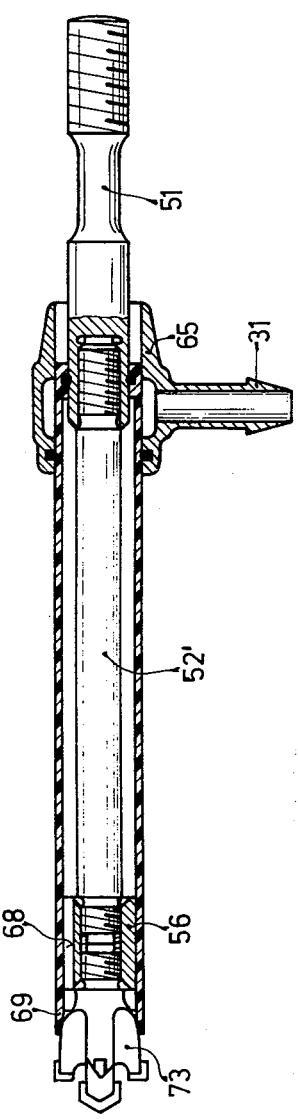

ROCK DRILL

BACKGROUND OF THE INVENTION

The present invention relates to a rock drill. More particularly, it relates to such a rock drill which comprises a shaft, a shank connected to a trailing end of the shaft, a drill head connected to a leading end of the shaft and a channel for transporting drillings extending substantially parallel to the shaft from the drill head toward the shank.

Rock drills of this type connected to a portable power unit such as a drilling machine or a hammer drill are already known in the art. Such drills are used for drilling large holes suitable for mounting wall switches therein, or for drilling large bores for extending pipes therethrough.

Drillings generated during the drilling process soils the working place and the operator which is especially undesirable when such work is performed in furnished rooms.

SUMMARY OF THE INVENTION

Accordingly, it is an object of the present invention to provide an improved rock drill which avoids the afore-mentioned disadvantages.

More particularly, it is an object of the present invention to provide an improved rock drill, having an efficiency not less than that of conventional rock drills, and which at the same time transports the drillings generated during a process of drilling securely out from the working zone and without soiling the surroundings.

With these objects in mind and with others which will become apparent hereafter, the rock drill, in accordance with the present invention, briefly stated, comprises a shell coaxially surrounding a shaft of the rock drill and having an open front end adjacent a drill head, a closed rear end adjacent a shank and at least one substantially transverse bore adjacent the rear end of the shell and open at the outer surface of the latter.

The transverse bore is connected to a suitable suction device, and drillings generated during drilling are sucked out from the drill head. It is desirable that the transverse bore communicates with a pipe connected to a conduit of the suction device. In another embodiment of the invention the rock drill comprises a swivel member rotatably mounted on the shell and secured against an axial displacement relative thereto, which swivel is provided with the above-mentioned suction pipe communicating with a conduit of the suction device. In a further embodiment of the invention the rock drill is formed of separate members which are connected to each other by means of a connecting member engaging with and supporting the inner surface of the shell.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a section of a multi-partite rock drill, in accordance with the present invention, comprising a shell connected to a shaft for joint rotation therewith and a swivel member rotatably mounted on the shell;

FIG. 5 is a section of the multi-partite rock drill similar to that shown in FIG. 4;

DESCRIPTION OF THE PREFERRED EMBODIMENTS

Figure 1:
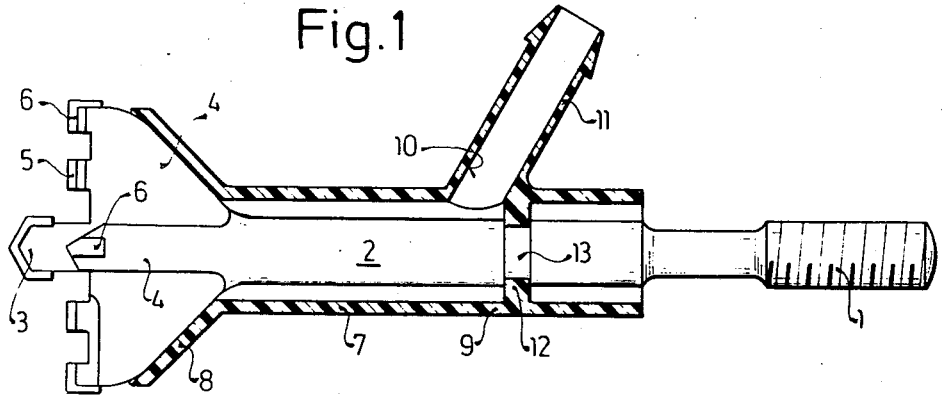
FIG. 1 is a section of a rock drill configured as a core bit and comprising a rotatable shell provided with a suction pipe.

FIG. 1 shows a rock drill configured as a cross bit. The rock drill has a centering drill bit 3 connected to a leading end of a shaft 2 and a shank 1 connected to a trailing end of the shaft 2. The shank 1 may be connected to a portable power unit by means, for example, a splined connection for transmitting torque thereto. Four radially projecting blades 4 enclosing with one another an angle of 90° are provided at the leading end of the shaft 2 carrying the centering drill bit 3. Carbide-tipped elements having cutting edges 5, 6 are mounted on the front faces of the respective blades 4 by means of soldering. The cutting edges 6 on the outer portion of the blades 4 project radially outwardly beyond the outer surface of the blades 4. The cutting edges 5 are mounted on radially inner portion of the blades 4. In a cross bit of a small diameter the cutting edges 5 may be omitted.

A shell 7 is provided which axially surrounds the shaft 2 and extends from the rear side of the blades 4 toward the shank 1. The shell 7 has a funnel-shaped part rearwardly of a front open end 8 of the shell, which part has, at the open end, a diameter equal to twice the radial dimension of each of the blades 4. At the same time the outer diameter of the funnel-shaped part of the shell 7 is smaller than the outer diameter of a drill head, that is than the maximum diametral dimension of the cutting edges. The shall 7 bounds a channel extending from the drill bit 3 towards the shank 1.

Adjacent a closed rear end 9 of the shell 7 a transverse bore 10 is provided which is open at the outer surface of the shell 7. The transverse bore 10 communicates with a pipe 11 adapted for connection with a conduit of a suction device, not shown in the drawing.

In this embodiment the shaft 2 is provided with an annular groove 13 and a ring-shaped flange 12 formed on the inner surface of the shell 7 adjacent the rear end of the latter and extends with small clearance into the groove 13 so as to enable the shaft 2 to be rotated relative to the shell 7, while maintaining a fixed axial position of the shell 7 relative to the shaft 2.

The core bit, in accordance with the present invention, can be connected to a portable power unit, for example, it can be mounted in a clamping device of a hammer drill. This can be performed by means of a splined connection of the shank 1 with a working head of the hammer drill. The section pipe 11 is connected to a suction device by means of a conduit. During drilling, the centering drill bit 3 and the cutting blades 5 and 6 cut stone or other material to be drilled. Drillings generated during the process are sucked into the channel bounded within the shell 7. The drillings are sucked into a front portion of this channel formed within the funnel-shaped part of the shell 7, then move through a circular space formed between the inner surface of a cylindrical part of the shell 7 and the shaft 2, and thereafter are sucked out through the transverse bore 10 into the suction device.

For easy dismounting of the shell 7 from the shaft and replacing it by a new one in case of a breakage or wear of the shell, the latter is constituted of plastic material, such as polyamide, and the ring-shaped flange 12 of the shell 7 is received in the groove 13 of the shaft 2 so as to form a snap lock.

Figure 2:
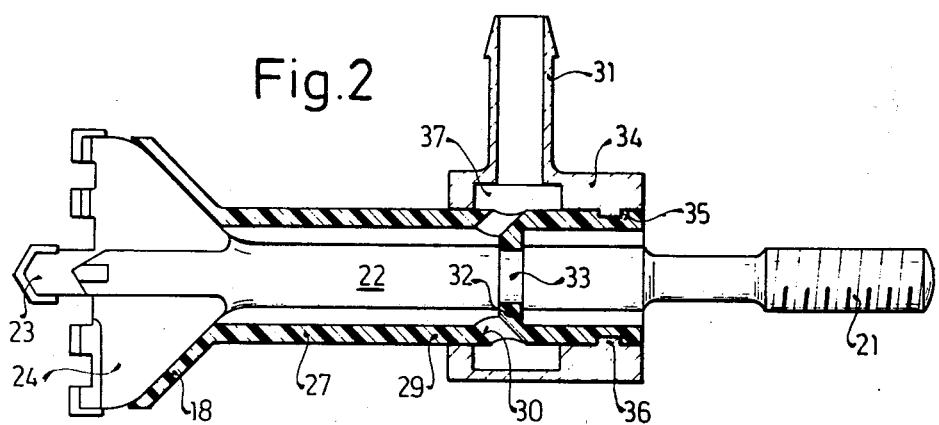
FIG. 2 is a section of a rock drill configured as a core bit and comprising a shell connected to a shaft for joint rotation therewith, and a swivel member rotatably mounted on the shell.

FIG. 2 shows a second embodiment of the rock drill, in accordance with the present invention, which is also configurated as a cross bit. This cross bit differs from the construction of the first embodiment in that a shell 27 is mounted on a shaft 22 for joint rotation therewith. The cross bit comprises a centering drill bit 23, blades 24 at the leading end of the shaft 22 and a shank 21 at the trailing end thereof, as clearly described in connection with the first embodiment of the invention. A front open end 18 of the shell 27 is similarly funnel-shaped and located rearwardly adjacent the blades 24. A ring-shaped flange 32 provided on the inner surface of the shell 27 adjacent the rear end 29 thereof engages in an annular groove 33 of the shaft 22 so as to form a snap lock and to provide joint rotation of the shell 27 with the shaft 22. Two transverse bores 30 located opposite to one another extend through the wall of the shell 27 and are open at the outer surface thereof. A swivel member 34 is coaxially mounted on the shell 27 rotatably relative thereto. The swivel member 34 is secured to the shell 27 by means of a further ring-shaped flange 36 formed on the inner surface of the swivel member 34 and received in a further annular groove 35 provided on the outer surface of the shell 27 so as to prevent an axial displacement of the sivel member 34 relative to the shell 27. The swivel member has an annular recess 37 which communicates, on the one hand, with the bores 30 and, on the other hand, with a suction pipe 31 projecting laterally from the swivel member 34 and connectable to a suction device, not shown in the drawing. The suction pipe 31, similarly to that of the first embodiment of the invention, serves to transport drillings generated during the drilling operation from the drill head toward the shank through the channel bounded by the shell 27.

The above described rock drill in accordance with the second embodiment of the invention shown in FIG. 2 differs from that of the first embodiment only in that the shell 27 rotates jointly with the shaft 22, and at the same time the shell 27 together with the shaft 22 rotate relative to the swivel member 34.

Figure 3:
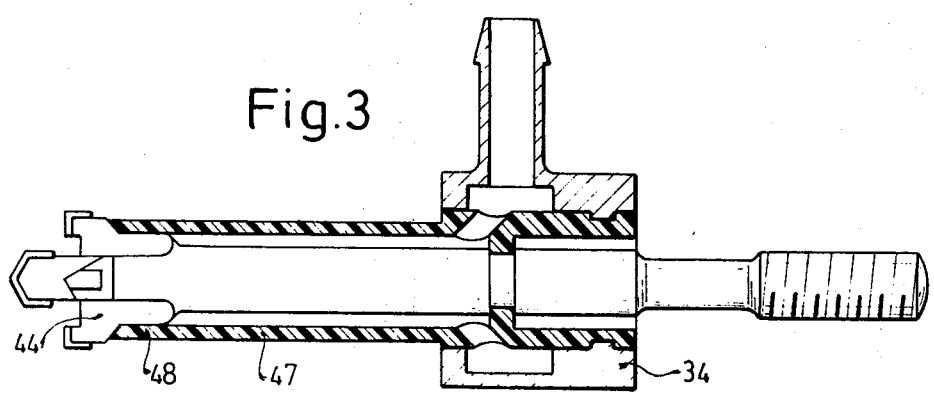
FIG. 3 is a section of another embodiment of the rock drill similar to that shown in FIG. 2.

FIG. 3 shows a rock drill in accordance with a third embodiment of the present invention, which rock drill is configurated as a cross bit having blades 44. The rock drill of this embodiment has a construction similar to the constructions of the previous embodiments, and differ only in that a front open end 48 of a shell 47 is not configurated as a funnel-shaped part. In this embodiment the shell 47 is also connected to a shaft for joint rotation therewith so that a swivel member 34 has to be used, as in the second embodiment of the invention. The shells 27 and 47 can be constituted of plastic material such as polyamide. The swivel member 34 can be constituted of the same material as the shells 27 and 47.

FIG. 4 shows a further embodiment of the present invention, where a rock drill is of a multi-partite construction, comprising a shank 51, at least two shaft parts 52 and a drill head 53, each constituted by a separate member. The shank 51 is connectable to a portable power unit by means, for example, a splined connection for transmitting torque. A front part of the shank 51 is provided with an internal bore 55 for receiving therein a rear end portion of the rear shaft part 52. Fastening means are provided on the inner surface of the internal bore 55 of the shank 51 and on the outer surface of the rear end portion of the rear shaft part 52 for transmitting torque and axial impact therebetween, which means can be constituted by threads on the respective surfaces and can include additional means such as rivets. It is understood that other fastening means also can be provided.

The other end portion of the rear shaft part 52 spaced from the shank 51 is received in a bore 57 of a nut-shaped connecting member 56 having a cylindrical outer surface. The rear end portion of the front shaft part 52 is received in the bore 57 of the connecting member 56 from the other end of the latter. The front end portion of the rear shaft part and the rear end portion of the front shaft part are received in the connecting member 56 so as to be coaxial relative one another. The outer surfaces of the above mentioned portions of the shaft parts 52 and the inner surface of the connecting member 56 are provided with fastening means similar to that provided on the rear end of the rear shaft part and the shank 51, which fastening means are adapted to transmit torque and axial impact between the parts of the shaft. A front end portion 69 of the front shaft part 52 spaced from the connecting member 56 is received in an axial internal bore 58 of the drill head 53. Further fastening means similar to the above mentioned fastening means are provided on the respective surfaces of the front end portion of the front shaft part and the bore 58 to transmit torque and axial impact from the front shaft part and the drill head 53.

The drill head 53 has at least two cutting edges 59. A duct 60 transporting drillings from the drill head 53 is provided which extends between the cutting edges substantially parallel to the axis of the shaft 52.

A shell 61 coaxially surrounds the shaft 52 of the rock drill and has a diameter corresponding to the diameter of the drill head 53. The front end portion 69 of the shell 61 tightly surrounds a reduced diameter portion of the drill head 53. The inner diameter of the shell 61 corresponds to the outer diameter of the connecting member 56 so that the connecting member 56 is engaged with and supports the inner surface of the shell 61. At least one duct 68 is provided on the outer surface of the connecting member 56 for providing communication between recesses formed between the inner surface of the shell and outer surface of the respective shaft parts 52 to opposite sides of the connecting member 56. This duct 68 is formed as a longitudinal groove extending substantially parallel to the axis of the connecting member 56.

The shell 61 is connected to the shaft 52 for joint rotation therewith by means for a ring-shaped flange 63 provided on the inner surface of the shell 61 adjacent the rear end 70 thereof, which flange engages the outer surface of a front part 54 of the shank 51 and clamps the latter with a snap lock. The above-mentioned snap lock is constituted by an O-ring 62 engaging the front part 54 of the shank 51 and an annular notch formed in the ring-shaped flange 63 of the shell 61 housing the O-ring. Two transverse bores 64 located opposite one another extend through the wall of the shell 61 adjacent the rear end thereof and are open at the outer surface of the shell 61. A swivel member 65 is coaxially mounted on the shell 61 rotatably relative to the latter. The swivel member 65 is secured to the shell so as to prevent an axial displacement relative to the latter by means of a snap lock similar to that shown in FIGS. 2 and 3. This snap lock also comprises an O-ring 66 at an inner part engaged in a notch provided on the outer surface of the shell 61 and at an outer part engaged in an annular groove formed in the inner surface of the swivel member 65.

The mode of operation of the rock drill of this embodiment is similar to that shown in FIG. 3. Drillings generated during the drilling operation are successively sucked from the cutting edges 59 through the duct 60 in the drill head 53, through the annular recess between the outer surface of the front shaft part 52 and the inner surface of the shell 61, through the duct 68 on the outer surface of the connecting member 56, through the annular recess between the outer surface of the rear shaft part 52 and the inner surface of the shell 61, and then through the transverse bores 64 and the suction pipe 31 into a suction device, not shown in the drawing. The annular recesses between the inner surface of the shell 61 and the outer surfaces of the shaft parts 52 are dimensioned so as to provide a minimum necessary speed of flowing air assuring transportation of the drillings. This speed is of about 3 meters per second.

A further embodiment of the invention is shown in FIG. 5. In this embodiment a rock drill is again multipartite. A shaft part 52' has a length larger than each part of the shaft 52 shown in FIG. 4 and is connected to a shank 51. A connecting member 56 is located in this embodiment adjacent to a drill head 73 of the cross bit. The drill head 73 is identical to the drill head shown in FIG. 3. The rock drill in accordance with this embodiment does not differ from that shown in FIG. 4 in function, mode of operation, and manner of transporting of drillings.

Figure 6:
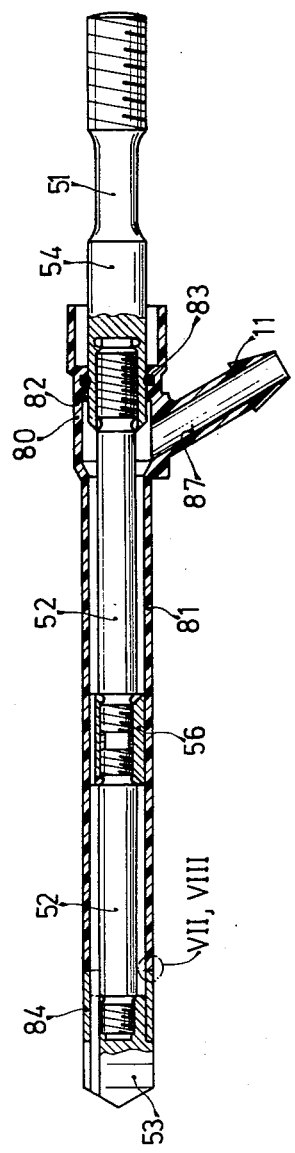
FIG. 6 is a section of the multi-partite rock drill comprising a rotatable shell provided with a suction pipe.

FIG. 6 shows a rock drill substantially corresponding to the rock drill shown in FIG. 4. It comprises a shank 51, two shaft parts 52 connected to one another by a connecting member 56, and a drill head 53, each constituted by a separate member.

A shell 81 is rotatably mounted on the rock drill and is prevented against an axial displacement by means of a snap lock. A ring-shaped flange 82 is formed on the inner surface of the shell 61 and engaged with the outer surface of a front part 54 of the shank 51. The snap lock for preventing the axial displacement of the shell comprises an O-ring 73 engaged with and housed in a notch provided on the outer surface of the front part 54 of the shank 51, and engaged with play in a groove provided in a ring-shaped flange 82.

Figure 8:
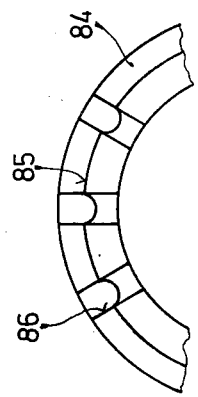
FIGS. 7 and 8 show a shell comprising a rear portion of plastic material and a front portion of a wear-resistant material connected to one another.
Figure 7:
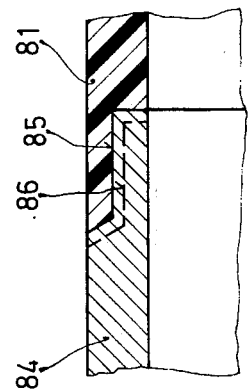

A front portion 84 of the shell 81 in this embodiment, in contradistinction to the construction of the previous embodiments, is constituted of a wear-resistant material, for example, hardened steel. The front portion 84 of the shell 81 has a rear section 85 and the rear portion thereof of plastic material, a front section 85, respectively, of a reduced thickness (FIGS. 7 and 8). In this embodiment the thickness of each of the sections is equal to half of the thickness of the shell portions. The sections 85 overlap one another. To improve a connection between the front metallic portion 84 of the shell and the rear portion thereof of plastic material, the outer surface of the section of the front portion 84 can be provided with longitudinal grooves extending parallel to the generatrix of this portion. It is understood that another means also can be provided to improve the mechanical connection of the above mentioned portions. The rear portion of the shell can be connected to the front portion 84 by using, for example, a process of extrusion so that the rear portion is extruded and molded onto the front portion of the shell.

The rock drill shown in FIG. 6 does not differ in a mode of operation from that shown in FIG. 1. The shell with the wear-resistant front portion has a longer lifetime that a shell consisting of plastic material. It is understood that the shell with such front portion can also be used in the rock drills which have the funnel-shaped front part as shown in FIGS. 1 and 2.

The rock drill in accordance with the present invention provides for highly advantageous results. The rock drill carries out drilling of rock with a high efficiency and, at the same time, transports drillings generated during the process of drilling out from the working zone without contamination of the surrounds and soiling of the operator.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rock drill comprising a shaft having a leading end and a trailing end; a shank connected to said trailing end of said shaft; a drill head, having a centering drill bit, connected to said leading end of said shaft; means for transporting drillings from said leading end towards said trailing end of said shaft, said means including at least one channel extending substantially parallel to said shaft from said drill head toward said shank; and a shell coaxially surrounding said shaft and bounding said channel, said shell having an open front end adjacent said drill head, a closed rear end facing said shank and at least one substantially transverse bore adjacent said rear end and open at the outer surface of said shell, said shell having at least two portions, including a front portion adjacent said front end of said shell and constituted of a wear-resistant material, and a rear portion adjacent said rear end of said shell, said front portion of said shell having a first section extending towards said rear portion of said shell and having a reduced thickness, said rear portion of said shell having a second section extending towards said front portion of said shell and having a reduced thickness, one of said sections overlapping the other section.

2. The rock drill as defined in claim 1, wherein said drill head has at least two radially extending cutting edges projecting radially outwardly beyond the outer diameter of said drill head; said channel extending between said cutting edges.

3. The rock drill as defined in claim 1, wherein said shell has an outer diameter at most equal to the outer diameter of said drill head.

4. The rock drill as defined in claim 1, wherein said shell has a funnel-shaped part rearwardly of said front end.

5. The rock drill as defined in claim 1, wherein said shell comprises a ring-shaped flange provided on the inner surface thereof adjacent said rear end of said shell, said ring-shaped flange sealingly engaging the outer surface of said shaft.

6. The rock drill as defined in claim 5, wherein said shaft has a shoulder, said ring-shaped flange of said shaft engaging said shoulder.

7. The rock drill as defined in claim 4, wherein said shaft has an annular groove on the outer surface thereof, said ring-shaped flange is received in said annular groove of said shaft.

8. The rock drill as defined in claim 5, wherein said shell is secured to said shaft by means of a snap lock.

9. The rock drill as defined in claim 8, wherein said shaft is rotatably mounted in said shell.

10. The rock drill as defined in claim 8, wherein said shell is connected to said shaft for joint rotation therewith.

11. The rock drill as defined in claim 8, wherein said snap lock consists of said ring-shaped flange on said shell.

12. The rock drill as defined in claim 5, wherein said snap lock comprises an O-ring engaging said shank and a notch provided in said ring-shaped flange and housing said O-ring.

13. The rock drill as defined in claim 1, and further comprising a pipe adapted for connecting with a conduit of a suction device; said transverse bore of said shell communicating with said pipe.

14. The rock drill as defined in claim 13, further comprising a swivel member rotatably mounted on said shell and secured against an axial displacement relative thereto, said swivel member being provided with said pipe.

15. The rock drill as defined in claim 1, wherein said shank, said shaft and said drill head are constituted by separate members, and further comprising fastening means connecting said separate members to each other and, adapted to transmit torque and axial impact between said members.

16. The rock drill as defined in claim 15 wherein said shaft is constituted by at least two separate parts respectively adjacent said drill head and said shank, and further fastening means connecting said separate parts to each other and adapted for transmitting torque and axial impact between said parts.

17. The rock drill as defined in claim 1, further comprises a nut-shaped connecting member adapted to receive therein proximal ends of said parts of said shaft to be connected; said further fastening means being provided on said connecting member.

18. The rock drill as defined in claim 17, wherein said connecting member is adapted to be engaged with and to support the inner surface of said shell.

19. The rock drill as defined in claim 1, wherein said connecting member is provided with at least one duct arranged on said outer surface of said connecting member and extending substantially parallel to said axis.

20. The rock drill as defined in claim 19, wherein said connecting member is located intermediate said front end and said rear end of said shell and forms a first recess defined between the outer surface of the part of said shaft adjacent said drill head and the inner surface of said shell, and a second recess defined between the outer surface of the part of said shaft adjacent said shank and the inner surface of said shell; said duct communicating said first recess with said second recess.

21. The rock drill as defined in claim 1, wherein at least portion of said shell is constituted of plastic material.

22. The rock drill as defined in claim 21, wherein said plastic material is polyamide.

23. The rock drill as defined in claim 1, wherein said thickness of each section is about a half of the thickness of the respective portions of said shell.

24. The rock drill as defined in claim 1, wherein said rear portion of said shaft is constituted of plastic material; said first section of said front portion of said shell has outer surface adapted for mechanical connecting with said rear portion of said shell of plastic material.

25. The rock drill as defined in claim 24, wherein said outer surface of said first section of said front part is provided with longitudinal grooves extending substantially parallel to the generatrix of said front part.

26. The rock drill as defined in claim 25, wherein said front portion of said shell is an extruded member.

27. The rock drill as defined in claim 1, wherein said drill head is configured as a core bit having a longitudinal axis; said channel extending substantially parallel to said axis.

28. The rock drill as defined in claim 1, wherein said drill head is configured as a cross bit having at least two radially extending blades, said blades carrying cutting edges on front sides thereof; said channel extending between said blades.

29. A rock drill, comprising a shaft having a leading end and a trailing end; a shank connected to said trailing end of said shaft; a drill head, having a centering bit, connected to said leading end of said shaft, said shank, said shaft and said drill head being constituted by separate members, said shaft being constituted by at least two separate parts respectively adjacent said drill head and said shank; fastening means connecting said separate members to each other and, adapted to transmit torque and axial impact between said separate members; means for transporting drillings from said leading end towards said trailing end of said shaft, said means including at least one channel extending substantially parallel to said shaft from said drill head toward said shank; and a shell coaxially surrounding said shaft and bounding said channel, said shell having an open front end adjacent said drill head, a closed rear end facing said shank and at least one substantially transverse bore adjacent said rear end and open at the outer surface of said shell; further fastening means connecting said separate parts of said shaft to each other and adapted for transmitting torque and axial impact between said parts, said further fastening means being provided with a nut-shaped connecting member adapted to receive therein proximal ends of said parts of said shaft to be connected and having a circular cylindrical surface and a longitudinal axis, said connecting member being adapted to be engaged with and to support the inner surface of said shell.

30. A rock drill as defined in claim 29, wherein said shell comprises at least two portions, including a front portion adjacent said front end of said shell and a rear portion adjacent said rear end of said shell; said front portion of said shell being constituted of a wear-resistant material.

31. The rock drill as defined in claim 30, wherein said wear-resistant material is hardened steel.

* * * * *